(12) United States Patent
Underdal et al.

(10) Patent No.: US 7,865,278 B2
(45) Date of Patent: Jan. 4, 2011

(54) DIAGNOSTIC TEST SEQUENCE OPTIMIZATION METHOD AND APPARATUS

(75) Inventors: Olav M. Underdal, Kalamazoo, MI (US); Harry M. Gilbert, Portage, MI (US); Oleksiy Portyanko, Portage, MI (US); Randy L. Mayes, Otsego, MI (US); Gregory J. Fountain, Kalamazoo, MI (US); William W. Wittliff, III, Gobles, MI (US)

(73) Assignee: SPX Corporation, Charlotte, NC (US)

( * ) Notice: Subject to any disclaimer, the term of this patent is extended or adjusted under 35 U.S.C. 154(b) by 1146 days.

(21) Appl. No.: 11/452,249

(22) Filed: Jun. 14, 2006

(65) Prior Publication Data

US 2007/0294000 A1     Dec. 20, 2007

(51) Int. Cl.
*G01M 17/00* (2006.01)
*G06F 7/00* (2006.01)
*G06F 19/00* (2006.01)

(52) U.S. Cl. ............ 701/29; 701/23; 340/438; 340/539.24; 340/853.2; 702/108; 702/119; 702/120; 702/123; 702/182; 702/183; 702/184; 702/185

(58) Field of Classification Search ............ 701/23, 701/29; 340/438, 539.24, 853.2; 702/108, 702/119, 120, 123, 182, 183, 184, 185
See application file for complete search history.

(56) References Cited

U.S. PATENT DOCUMENTS

| | | | | |
|---|---|---|---|---|
| 4,796,206 A | * | 1/1989 | Boscove et al. | 701/99 |
| 4,943,919 A | * | 7/1990 | Aslin et al. | 701/3 |
| 4,954,964 A | * | 9/1990 | Singh | 706/11 |
| 5,010,487 A | * | 4/1991 | Stonehocker | 701/29 |
| 5,023,791 A | * | 6/1991 | Herzberg et al. | 701/35 |
| 5,025,392 A | * | 6/1991 | Singh | 706/50 |

(Continued)

FOREIGN PATENT DOCUMENTS

JP     06265596     9/1994

(Continued)

OTHER PUBLICATIONS

Tariq Assaf; Joanne Bechta Dugan "Automatic Generation of Diagnostic Expert Systems From Fault Trees," 2003 Proceedings Annual Reliability and Maintainability Symposium, pp. 143-147.*

(Continued)

*Primary Examiner*—Khoi Tran
*Assistant Examiner*—Jorge O Peche
(74) *Attorney, Agent, or Firm*—Baker & Hostetler LLP (57) ABSTRACT

A diagnostic test sequence optimizer includes a diagnostic test selector that determines a group of diagnostic test procedures related to a specific symptom and vehicle type from a pool of diagnostic procedures. A failure mode analyzer then selects one or more factors that can affect resolution of a vehicle operational problem and performs a failure mode analysis to quantify a comparative utility of the individual tests, and a factor weighter assigns a weight to each of the factors. A vehicle receiver receives information regarding the history of the test subject vehicle, and a sequence optimizer places the diagnostic test procedures in an optimized sequence in accordance with the comparative utilities of the individual diagnostic procedures, user preferences and a Failure Mode and Effects Analysis compiled by the manufacturer of the vehicle.

33 Claims, 3 Drawing Sheets

U.S. PATENT DOCUMENTS

| | | | | |
|---|---|---|---|---|
| 5,036,479 A * | 7/1991 | Prednis et al. | | 702/121 |
| 5,099,436 A * | 3/1992 | McCown et al. | | 702/82 |
| 5,109,380 A * | 4/1992 | Ogino | | 714/26 |
| 5,111,402 A * | 5/1992 | Brooks et al. | | 701/35 |
| 5,161,158 A * | 11/1992 | Chakravarty et al. | | 714/26 |
| 5,184,312 A * | 2/1993 | Ellis | | 702/121 |
| 5,270,920 A * | 12/1993 | Pearse et al. | | 705/8 |
| 5,293,323 A * | 3/1994 | Doskocil et al. | | 702/185 |
| 5,396,422 A * | 3/1995 | Forchert et al. | | 701/33 |
| 5,561,762 A * | 10/1996 | Smith et al. | | 714/33 |
| 5,572,424 A * | 11/1996 | Kellogg et al. | | 701/29 |
| 5,617,039 A * | 4/1997 | Kuck et al. | | 324/771 |
| 5,631,831 A * | 5/1997 | Bird et al. | | 701/29 |
| 5,670,939 A * | 9/1997 | Rodewald et al. | | 340/514 |
| 5,696,676 A * | 12/1997 | Takaba | | 701/31 |
| 5,729,452 A * | 3/1998 | Smith et al. | | 701/29 |
| 5,778,381 A * | 7/1998 | Sandifer | | 1/1 |
| 5,835,871 A * | 11/1998 | Smith et al. | | 701/29 |
| 5,838,261 A * | 11/1998 | Lauta et al. | | 340/945 |
| 5,883,586 A * | 3/1999 | Tran et al. | | 340/945 |
| 5,964,811 A * | 10/1999 | Ishii et al. | | 701/29 |
| 5,964,813 A * | 10/1999 | Ishii et al. | | 701/29 |
| 5,987,443 A * | 11/1999 | Nichols et al. | | 706/11 |
| 6,003,021 A * | 12/1999 | Zadik et al. | | 706/47 |
| 6,003,808 A * | 12/1999 | Nguyen et al. | | 244/1 R |
| 6,012,152 A * | 1/2000 | Douik et al. | | 714/26 |
| 6,064,998 A * | 5/2000 | Zabloudil et al. | | 706/45 |
| 6,067,537 A * | 5/2000 | O'Connor et al. | | 706/47 |
| 6,067,538 A * | 5/2000 | Zorba et al. | | 706/47 |
| 6,073,127 A * | 6/2000 | Lannert et al. | | 706/45 |
| 6,085,184 A * | 7/2000 | Bertrand et al. | | 706/45 |
| 6,122,575 A * | 9/2000 | Schmidt et al. | | 701/29 |
| 6,134,488 A * | 10/2000 | Sasaki et al. | | 701/31 |
| 6,226,627 B1 | 5/2001 | Polak | | |
| 6,249,755 B1 * | 6/2001 | Yemini et al. | | 702/183 |
| 6,301,531 B1 * | 10/2001 | Pierro et al. | | 701/29 |
| 6,314,375 B1 * | 11/2001 | Sasaki et al. | | 702/34 |
| 6,370,455 B1 * | 4/2002 | Larson et al. | | 701/33 |
| 6,574,537 B2 * | 6/2003 | Kipersztok et al. | | 701/29 |
| 7,379,846 B1 * | 5/2008 | Williams et al. | | 702/185 |
| 7,643,912 B2 * | 1/2010 | Heffington | | 701/1 |
| 2002/0087237 A1 * | 7/2002 | Ol et al. | | 701/31 |
| 2006/0095230 A1 * | 5/2006 | Grier et al. | | 702/183 |
| 2006/0142910 A1 * | 6/2006 | Grier et al. | | 701/29 |
| 2007/0088465 A1 * | 4/2007 | Heffington | | 701/1 |

OTHER PUBLICATIONS

U.S. Appl. No. 11/052,118, filed Feb. 8, 2005, Fountain, et al.

* cited by examiner

DIAGNOSTIC TEST SEQUENCE OPTIMIZATION METHOD AND APPARATUS

FIELD OF THE INVENTION

The present invention relates generally to diagnostic equipment. More particularly, the present invention relates to the optimization of diagnostic test sequences, such as vehicle diagnostic test sequences, for diagnostic systems.

BACKGROUND OF THE INVENTION

Diagnostic systems are used by technicians and professionals in virtually all industries to perform basic and advanced system testing functions. For example, in the automotive, trucking, heavy equipment and aircraft industries, diagnostic test systems provide for vehicle onboard computer fault or trouble code display, interactive diagnostics, multi-scope and multimeter functions, and electronic service manuals. In the medical industry, diagnostic systems provide for monitoring body functions and diagnosis of medical conditions, as well as system diagnostics to detect anomalies in the medical equipment.

In many industries, diagnostic systems play an increasingly important role in manufacturing processes, as well as in maintenance and repair throughout the lifetime of the equipment or product. Some diagnostic systems are based on personal computer technology and feature user-friendly, menu-driven diagnostic applications. These systems assist technicians and professionals at all levels in performing system diagnostics on a real-time basis.

A typical diagnostic system includes a display on which instructions for diagnostic procedures are displayed. The system also includes a system interface that allows the operator to view real-time operational feedback and diagnostic information. Thus, the operator may view, for example, vehicle engine speed in revolutions per minute, or battery voltage during start cranking; or a patient's heartbeat rate or blood pressure. With such a system, a relatively inexperienced operator may perform advanced diagnostic procedures and diagnose complex operational or medical problems.

The diagnostic procedures for diagnostic systems of this sort are typically developed by experienced technical experts or professionals. The technical expert or professional provides the technical experience and knowledge required to develop complex diagnostic procedures. Thus, the efficacy of the diagnostic procedures, in particular the sequence in which the diagnostic procedures are performed, is highly dependent on the expertise of the technical expert or professional authoring the procedures.

Thus, existing diagnostic systems have a disadvantage in that the sequence of execution of diagnostic procedures is highly dependent upon the expertise of the technical experts and professionals who author the diagnostic procedures. The technical experts and professionals often do not have access to complete information regarding historical outcomes of diagnostic testing that has been performed, and in particular, statistical information regarding the historical outcomes of diagnostic testing. As a result, diagnostic testing can consume unnecessary time and cost, because it is based on incomplete information. Accordingly, it is desirable to provide a method and apparatus for optimizing the sequence of diagnostic test procedures that can be executed on diagnostic systems.

SUMMARY OF THE INVENTION

The foregoing needs are met, to a great extent, by the present invention, wherein in one aspect an apparatus and method are provided that in some embodiments provide for optimizing a sequence of diagnostic procedures that can be executed on a diagnostic system.

In accordance with one aspect of the present invention, a computer-implemented method of optimizing a diagnostic test sequence to diagnose a failure mode of a vehicle can include determining a group of diagnostic tests related to a symptom from a pool of diagnostic tests and selecting a first diagnostic test from the group based at least in part on a probabilistic failure mode analysis.

In accordance with another aspect of the present invention, a computer program product for optimizing a diagnostic test sequence to diagnose a failure mode of a vehicle, including a computer-readable medium encoded with instructions configured to be executed by a processor in order to perform predetermined operations, which can include determining a group of diagnostic tests related to a symptom from a pool of diagnostic tests and selecting a first diagnostic test from the group based at least in part on a probabilistic failure mode analysis.

In accordance with yet another aspect of the present invention, diagnostic tool for optimizing a diagnostic test sequence to diagnose a failure mode of a vehicle can include a diagnostic test selector configured to determine a group of diagnostic tests related to a symptom from a pool of diagnostic tests and a sequence optimizer configured to select a first diagnostic test from the group based at least in part on a probabilistic failure mode analysis.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

An embodiment of the present inventive method and apparatus can provide a diagnostic test sequence optimizer that can determine a group of individual diagnostic tests, or procedures, related to a symptom from a pool of diagnostic procedures to diagnose a failure mode of a vehicle. The diagnostic test sequence optimizer can also include a failure mode analyzer that can quantify a comparative utility of the individual diagnostic tests, as well as a factor weighter that can assign a weight to each of a number of individual factors that can be figured into the failure mode analysis.

The diagnostic test sequence optimizer can further include a vehicle history receiver that can receive information regarding the maintenance and repair history of the vehicle under test, which can also be factored into the failure mode analysis. The diagnostic test sequence optimizer can also include a sequence optimizer that can arrange the order the diagnostic tests in accordance with the individual comparative utilities of the tests and other significant factors. In addition, the failure mode analyzer and the sequence optimizer can take into account user preferences to further optimize the diagnostic test sequence.

An embodiment of the diagnostic test sequence optimizer can complement or can be an integral part of a diagnostic test procedure generator. An example of a diagnostic test procedure generator that is compatible with the interactive diagnostic schematic generator is disclosed in copending U.S. Patent Application, entitled "Diagnostic Decision Sequencing Method and Apparatus for Optimizing a Diagnostic Test Plan," filed concurrently herewith by Fountain, et al., the disclosure of which is hereby incorporated by reference in its entirety.

Figure 1:
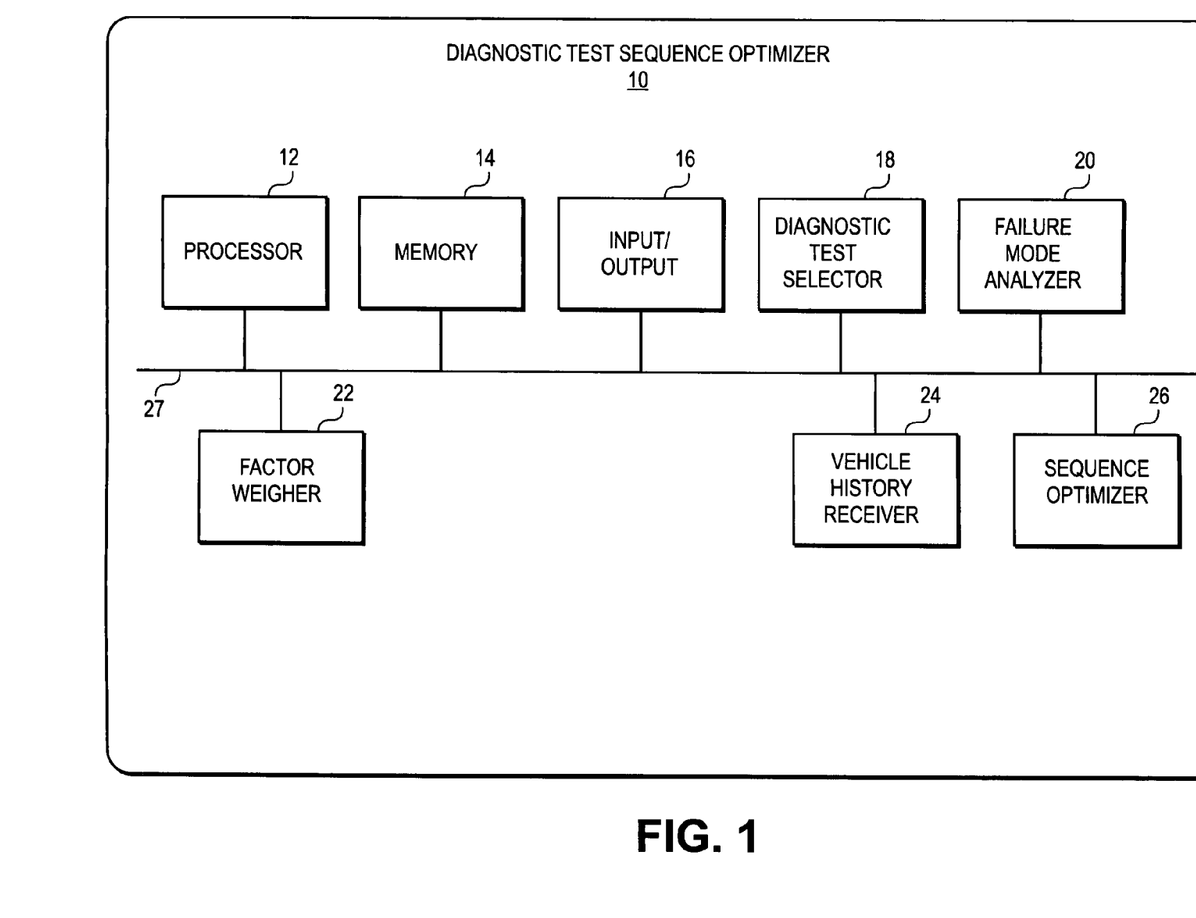
FIG. 1 is a schematic diagram illustrating a diagnostic test sequence optimizer according to an embodiment of the invention.

The invention will now be described with reference to the drawing figures, in which like reference numerals refer to like parts throughout. An embodiment of the present inventive apparatus and method is illustrated in FIG. 1, which illustrates a diagnostic test sequence optimizer 10. The diagnostic test sequence optimizer 10 can produce a vehicle diagnostic test sequence for use with, for example, a PC-based vehicle diagnostic system to provide instructions for expert diagnostic procedures to allow a vehicle technician to identify the cause of a trouble code or operational problem at the component level.

An example of a diagnostic method for use with a vehicle diagnostic system of this type is disclosed in U.S. Pat. No. 5,631,831, entitled "Diagnosis Method For Vehicle Systems," to Bird, et al., dated May 20, 1997, the disclosure of which is hereby incorporated by reference in its entirety. The diagnostic test sequence can navigate a vehicle technician through a step-by-step test sequence based on a vehicle onboard computer trouble code or a vehicle operational symptom. For example, during vehicle diagnostics, test step instructions and related information can be displayed to the vehicle technician on a display screen panel.

Diagnostic procedures can be authored, for example, by an expert vehicle technician, and subsequently ordered in an optimal sequence by the diagnostic test sequence optimizer 10. An example of a method for authoring diagnostic procedures for use with a vehicle diagnostic system is disclosed in U.S. patent application Ser. No. 11/052,118, filed by Fountain, et al. on Feb. 8, 2005, the disclosure of which is hereby incorporated by reference in its entirety.

The diagnostic test sequence optimizer 10 can include a processor 12, a memory 14, an input/output device 16, a diagnostic test selector 18, a failure mode analyzer 20, a factor weighter 22, a vehicle history receiver 24 and a sequence optimizer 26, all of which can be interconnected by a data bus 27. The processor 12, the memory 14, the input/output device 16 and the display device 34 can be part of a general computer, such as a personal computer (PC), a notebook, a UNIX workstation, a server, a mainframe computer, a personal digital assistant (PDA), or some combination of these. Alternatively, the processor 12, the memory 14 and the input/output device 16 can be part of a specialized computing device, such as a vehicle diagnostics scan tool. The remaining components can include programming code, such as source code, object code or executable code, stored on a computer-readable medium that can be loaded into the memory 14 and processed by the processor 12 in order to perform the desired functions of the diagnostic test sequence optimizer 10.

In various embodiments, the diagnostic test sequence optimizer 10 can be coupled to a communication network, which can include any viable combination of devices and systems capable of linking computer-based systems, such as the Internet; an intranet or extranet; a local area network (LAN); a wide area network (WAN); a direct cable connection; a private network; a public network; an Ethernet-based system; a token ring; a value-added network; a telephony-based system, including, for example, T1 or E1 devices; an Asynchronous Transfer Mode (ATM) network; a wired system; a wireless system; an optical system; a combination of any number of distributed processing networks or systems or the like.

An embodiment of the diagnostic test sequence optimizer 10 can be coupled to the communication network by way of the local data link, which in various embodiments can incorporate any combination of devices—as well as any associated software or firmware—configured to couple processor-based systems, such as modems, network interface cards, serial buses, parallel buses, LAN or WAN interfaces, wireless or optical interfaces and the like, along with any associated transmission protocols, as may be desired or required by the design.

Additionally, an embodiment of the diagnostic test sequence optimizer 10 can communicate information to the user and request user input by way of an interactive, menu-driven, visual display-based user interface, or graphical user interface (GUI). The user interface can be executed, for example, on a personal computer (PC) with a mouse and keyboard, with which the user may interactively input information using direct manipulation of the GUI. Direct manipulation can include the use of a pointing device, such as a mouse or a stylus, to select from a variety of selectable fields, including selectable menus, drop-down menus, tabs, buttons, bullets, checkboxes, text boxes, and the like. Nevertheless, various embodiments of the invention may incorporate any number of additional functional user interface schemes in place of this interface scheme, with or without the use of a mouse or buttons or keys, including for example, a trackball, a touch screen or a voice-activated system.

The diagnostic test selector 18 can determine a group of diagnostic tests that are related to or based on a symptom of a vehicle operational fault or an onboard computer trouble code. The determination can be based, for example, on a diagnostic Failure Mode and Effects Analysis (FMEA) or on an author priority setting.

A FMEA, or equivalently, a Failure Mode and Effects Criticality Analysis (FMECA), is a widely used tool in manufacturing industries, for example, the aerospace industry, the automotive industry, the heavy equipment industry and the digital electronics industry. A typical FMEA can include a list of failure modes and causes, effects associated with each of the failure modes, a severity of each failure mode, a risk or probability of the occurrence of each failure mode and additional information that can be useful in designing and manufacturing the associated product. For example, the FMEA can include estimated probability information based on engineering analysis or statistical probability estimates based on empirical data from actual failures. Thus, each diagnostic test procedure can be an individual failure mode test based on the failure modes identified in the FMEA, and the FMEA information can be used to determine which of the diagnostic test procedures is most likely to identify the cause of the symptom.

The FMEA or probability information available to the diagnostic test sequence optimizer 10 can be updated periodically with new estimates or empirical vehicle fleet failure mode information, for example, from a central database maintained by a service center or the vehicle manufacturer. Thus, the FMEA or probability information can be automatically updated, for example, over a communication network.

Some existing diagnostic test systems include sequences of diagnostic test procedures that can performed on a vehicle or other product to determine a cause of a symptom. However, in some existing systems the sequence of the diagnostic tests is determined based solely on the priority assigned by an expert diagnostic author. An embodiment of the present invention can have the advantage that the diagnostic test procedure sequence can be optimized using statistical probability information based on historical outcomes of actual diagnostic testing in order to more accurately determine the efficacy of each of the diagnostic procedures. As a result, the diagnostic test procedure sequence can be customized to minimize or optimize the time required to resolve the problem, the cost required to resolve the problem, additional factors that can affect the problem resolution, a combination of these factors, or the like.

The failure mode analyzer 20 can perform an analysis of the comparative utility of each of the individual diagnostic procedures based on a number of different factors that can affect problem resolution. For example, the failure mode analysis factors can include one or more of the following:

an estimated time required to perform a diagnostic test
the difficulty of performing the diagnostic test
an estimated time required to remove and replace a component associated with the diagnostic test
the difficulty of removing and replacing the component
the level of expertise of a vehicle service technician performing the diagnostic procedure
the availability of a replacement component
the estimated cost or the actual cost of the component
the estimated or actual cost of labor
empirical data regarding the probability that a failure mode associated with the individual diagnostic procedure exists given the existence of a specified symptom (e.g., FMEA data)
an estimate of the probability that the failure mode exists given the existence of the symptom
a frequency or rate of the failure mode associated with the diagnostic procedure
the mileage of the subject vehicle
the specific configuration of the vehicle or a modification that has been performed on the vehicle
the vehicle maintenance record
a service center maintenance record regarding the vehicle or associated vehicles
a manufacturer warranty record associated with the specific vehicle or a type of vehicle
a recommended maintenance schedule, such as a manufacturer recommended maintenance schedule, or
a technical service bulletin issued by the vehicle manufacturer.

In addition, the factor weighter 22 can assign a weight or weighting to each of the factors used in the failure mode analysis. For example, a heavier weighting can be given to the time required to perform an individual diagnostic procedure versus the cost of performing the procedure and replacing an associated component, or vice-versa. Similarly, a greater weight can be assigned to the difficulty of performing the diagnostic procedure, for example, in relation to the expertise level of the vehicle technician. In other cases, a greater weighting may be placed on the availability of a replacement component. For example, a diagnostic procedure related to a component that is not available may be given a particularly low weighting. In yet other cases, a heavier weighting can be assigned to a diagnostic procedure associated with a recommended maintenance procedure that is coming due, for example, based on the vehicle mileage, and has not been performed on the subject vehicle. Similarly, a heavy weighting can be placed on a diagnostic procedure related to a technical service bulletin, such as a recommended technical service bulletin issued by the vehicle manufacturer.

Furthermore, the weights can be partially determined based on user preferences. For example, a user preference setting can be set by a diagnostic procedure author, by a service center or by a vehicle technician, and subsequently factored into the individual weightings of the factors. For example, a service center or a vehicle technician may prefer to minimize either time or cost, depending on the vehicle type, customer feedback or the like. Thus, a user input, for example, received via the input/output device 16, can be used by the factor weighter 22 in determining the weightings of certain critical factors in accordance with user preferences.

The vehicle history receiver 24 can receive a history of the vehicle, for example, a maintenance or repair record kept with the vehicle, at a service center, or by the manufacturer. For example, the vehicle history can include information such as the mileage on the subject vehicle, the specific configuration of the vehicle, a modification such as a technical service bulletin that has been performed on the vehicle, a vehicle maintenance record, a service center maintenance record associated with the specific vehicle or type of vehicle, or a manufacturer warranty record associated with the specific vehicle or type of vehicle.

Accordingly, the sequence optimizer 26 can use the outcome from the failure mode analysis performed by the failure mode analyzer 20, the vehicle history received by the vehicle history receiver 24, user settings received by way of user input, a diagnostic FMEA or other input factors to arrange, or order, the diagnostic test procedures in a sequence. The sequence can be optimized in accordance with the priority input by a diagnostic test procedure author, a user preference input and any combination of the failure mode analysis factors. Thus, the sequence optimizer 26 is highly configurable to allow customization of the sequence optimization process.

For example, the diagnostic test procedures can be ordered according to the probability of identifying a specific cause of a symptom in a minimum amount of time. As another example, the diagnostic test sequence can be optimized according to the probability of identifying the cause of the symptom with a minimum cost. Additionally, the diagnostic test sequence can be optimized according to a relative weighting of the importance of minimizing time versus minimizing cost. Thus, the sequence optimizer 26 can be configured to optimize the diagnostic test sequence in accordance with any desired combination of priorities or preferences.

In addition, in some embodiments of the diagnostic test sequence optimizer 10, the diagnostic test procedures can be ordered based on multiple symptoms. For example, the failure mode analyzer 20 can evaluate two or more simultaneously occurring or intermittent symptoms in order to identify a possible common cause. Accordingly, the sequence optimizer 26 can dynamically reorder the test procedure sequence during test execution based on an interrelation of two or more symptoms. For example, failure mode analyzer 20 may identify a common voltage source for two sensors that simultaneously have symptoms, and the sequence optimizer 26 can reorder the test sequence to verify the functionality of the common voltage source before performing failure mode tests on the individual sensors. Once again, the test sequence can also be based on the comparative failure rates of the individual sensors and the common voltage source.

Moreover, in some embodiments of the diagnostic test sequence optimizer 10, the sequence optimizer 26 can dynamically reorder the test sequence during test execution based on intermediate results, for example, based on the results of a particular failure mode test or a combination of failure mode tests. For example, even though a particular failure mode test does not result in a final diagnosis, the failure mode test, alone or in combination with one or more other failure mode tests, can validate the correct functionality of a component. As a result, the sequence optimizer 26 can dynamically reorder the test sequence, for example, to omit further failure mode tests corresponding the validated component, or to move remaining failure mode tests corresponding the validated component to a later position of lesser priority in the test sequence.

Similarly, in some embodiments of the diagnostic test sequence optimizer 10, the sequence optimizer 26 can dynamically reorder the test sequence during diagnostic test execution based on new information derived from a particular failure mode test, although the failure mode test does not result in a final diagnosis. For example, the discovery of an additional symptom during a particular failure mode test can result in the sequence optimizer 26 modifying the test sequence based on the interrelation of the newly discovered symptom and the previously known symptom or symptoms. Thus, the sequence optimizer 26 can perform iterative, dynamic, run-time reevaluations during diagnostic test execution to continually modify or recreate the test sequence.

Moreover, the diagnostic test sequence optimizer 10 can be combined with additional diagnostic system capabilities, such as vehicle state tracking, a graphical user interface and interactive diagnostic schematics, to form an intelligent diagnostic system that can aid vehicle technicians in resolving vehicle operational problems in an optimized manner.

For example, the current vehicle state can be used in optimizing the diagnostic test sequence. That is to say, preconditions required for a diagnostic procedure such as cover panels or components that are removed or modified during individual diagnostic procedures, test equipment that is connected to the vehicle, and similar such information related to the vehicle state can be used by the sequence optimizer 26 to determine the diagnostic test sequence.

Figure 2:
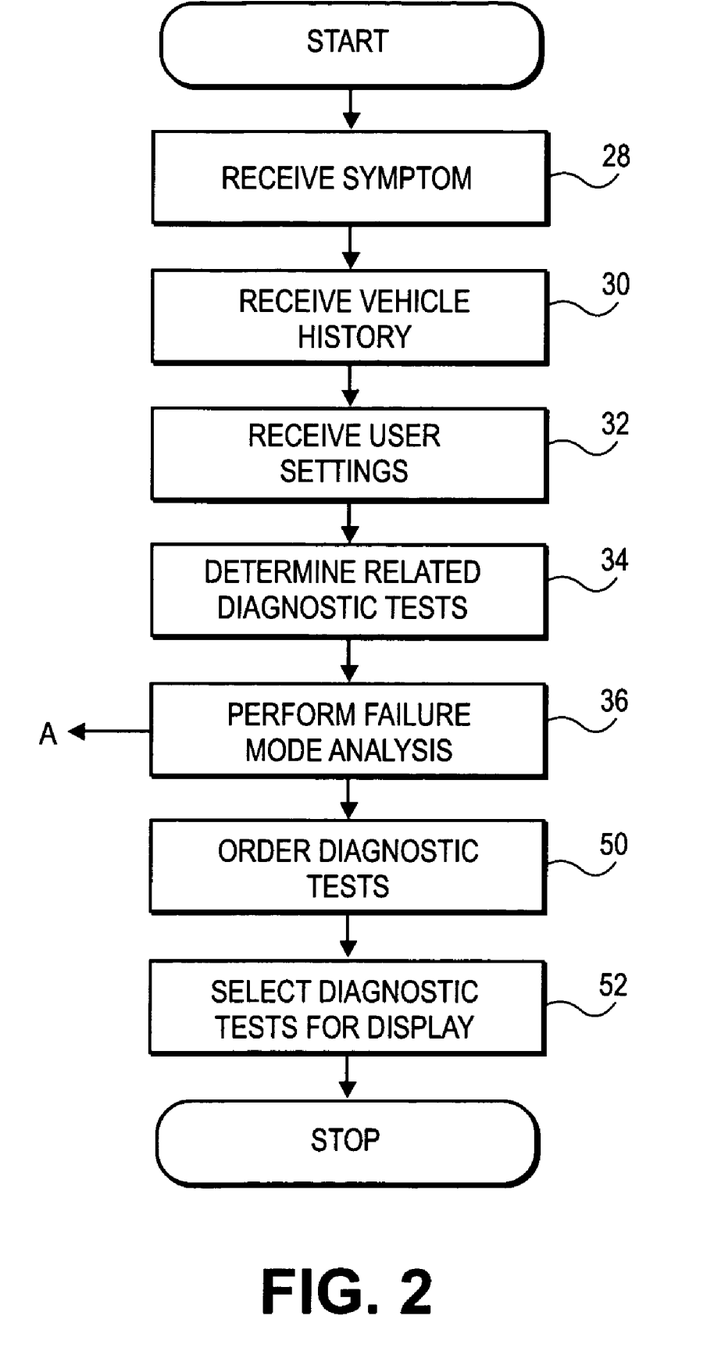
FIG. 2 is a flow chart illustrating steps that may be followed in accordance of one embodiment of the method or process of optimizing a diagnostic test sequence.

FIG. 2 illustrates a method or process for optimizing a diagnostic test sequence. The process can begin by proceeding to step 28, "RECEIVE SYMPTOM," in which a symptom such as a vehicle operational problem or a diagnostic trouble code can be received for diagnosis to identify a failure mode of a vehicle. Next, in step 30, "RECEIVE VEHICLE HISTORY," history information regarding a specific test subject vehicle can be received, such as vehicle mileage, vehicle configuration, vehicle modifications, maintenance record or warranty record. Then, in step 32, "RECEIVE USER SETTINGS," a user preference input can be received.

Control then passes to step 34, "DETERMINE RELATED DIAGNOSTIC TESTS," in which diagnostic tests, or procedures, that are related to the symptom and vehicle type can be identified from a pool of diagnostic tests. The diagnostic tests can be, for example, authored by an expert diagnostic technician, or converted from an existing fault tree or a diagnostic FMEA. Each of the diagnostic test procedures can be associated with a specific failure mode of a vehicle component.

Figure 3:
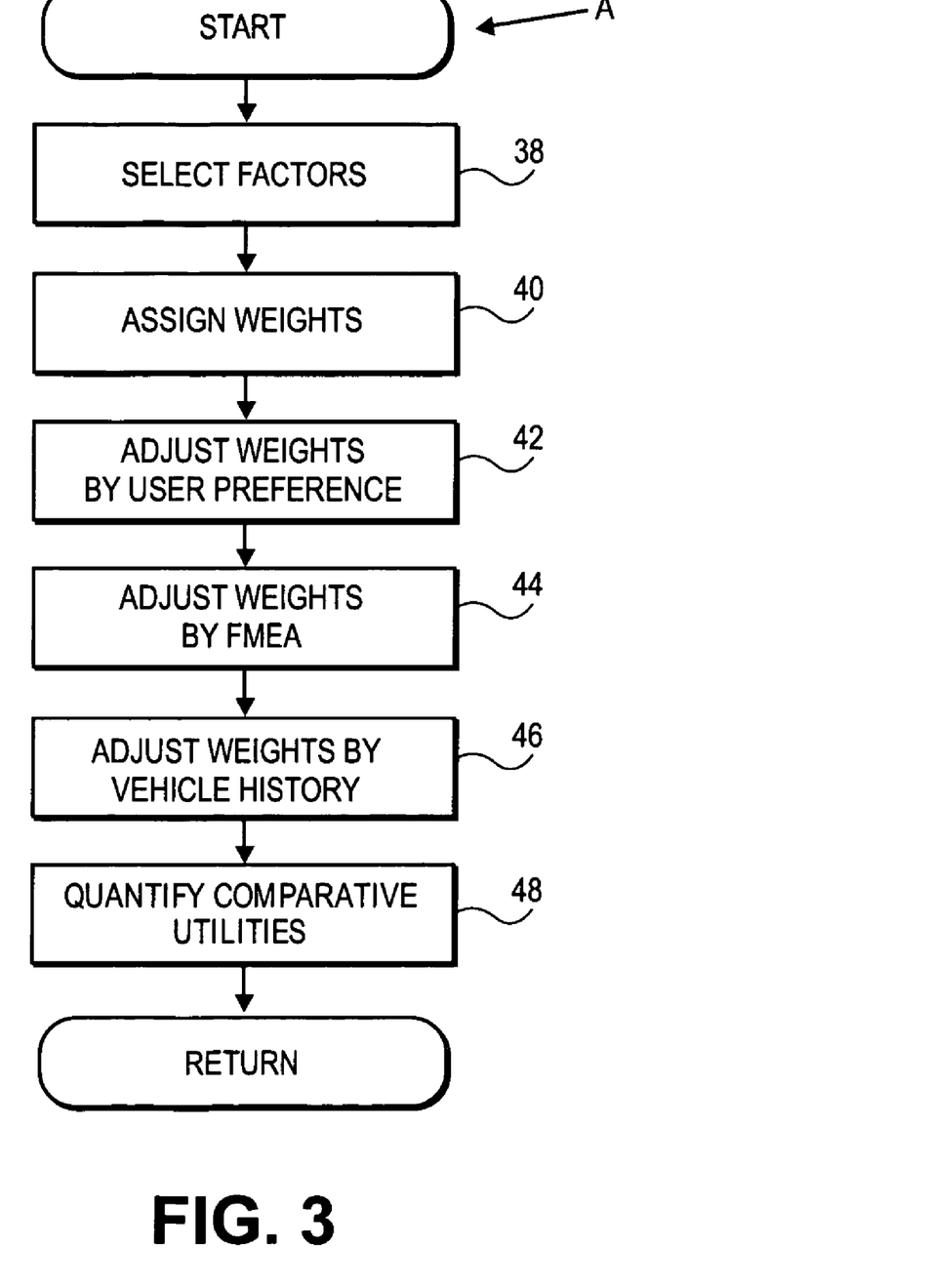
FIG. 3 is a flow chart illustrating steps that may be followed to perform a failure mode analysis that is compatible with the method of FIG. 2.

At this point, in step 36, "PERFORM FAILURE MODE ANALYSIS," a comparative utility of each of the individual diagnostic test procedures can be quantified. FIG. 3 illustrates a method or process for performing a failure mode analysis. In step 38, "SELECT FACTORS," one or more factors that can affect the resolution of a failure mode can be selected for use in the analysis, as described above. Next, in step 40, "ASSIGN WEIGHTS," a weight, or weighting, can be assigned to each of the selected factors in accordance with a priority or preference representing the relative importance of each of the factors with regard to remaining factors.

Control then passes to step 42, "ADJUST WEIGHTS BY USER PREFERENCE," in which each of the weights can be adjusted to reflect a user preference setting, as described above. Next, in step 44, "ADJUST WEIGHTS BY FMEA," each of the weights can be adjusted to reflect the information, such as probability or risk factors from the FMEA, as described above. In turn, in step 46, "ADJUST WEIGHTS BY VEHICLE HISTORY," each of the weights can be adjusted in accordance with the vehicle history, such as a recommended maintenance procedure that is coming due and has not been performed on the vehicle, as described above.

Subsequently, in step 48, "QUANTIFY COMPARATIVE UTILITIES," the weighted factors can be used in an algorithm to determine a numerical comparative utility for each of the diagnostic test procedures. For example, the comparative utility can reflect the likelihood that the test procedure will result in resolution of the problem taking into account the time and cost required to perform the diagnostic procedure.

Returning to FIG. 2, in step 50, "ORDER DIAGNOSTIC TESTS," the diagnostic test procedures can be placed in an order that optimizes the overall utility of the diagnostic test sequence. That is, the diagnostic test procedures can be placed in a sequence that optimizes selected factors in accordance with user preferences and the vehicle history, or other desired factors, as described above.

At this point, in step 52, "SELECT DIAGNOSTIC TESTS FOR DISPLAY," a subset of the diagnostic tests can optionally be selected for display on a display device. Thus, the optimized sequence of diagnostic test procedures can be presented to a vehicle technician to aide the vehicle technician in diagnosing a failure mode associated with a vehicle system.

FIGS. 1, 2 and 3 are block diagrams and flowcharts of methods, apparatuses and computer program products according to various embodiments of the present invention. It will be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus according to the present invention can include other means, such as hardware or some combination of hardware and software, including one or more processors or controllers, for performing the disclosed functions.

In this regard, FIG. 1 depicts the apparatus of one embodiment including several of the key components of a general-purpose computer by which an embodiment of the present invention may be implemented. Those of ordinary skill in the art will appreciate that a computer can include many more components than those shown in FIG. 1. However, it is not necessary that all of these generally conventional components be shown in order to disclose an illustrative embodiment for practicing the invention. The general-purpose computer can include a processing unit 12 and a system memory 14, which may include random access memory (RAM) and read-only memory (ROM). The computer also may include nonvolatile storage memory, such as a hard disk drive, where additional data can be stored.

An embodiment of the present invention can also include one or more input or output devices 16, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

Typically, computer program instructions may be loaded onto the computer or other general purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer-implemented method of optimizing a diagnostic test sequence to diagnose a failure mode of a vehicle, comprising:
   determining a group of diagnostic tests related to a symptom from a pool of diagnostic tests;
   conducting a probabilistic failure mode analysis determining the efficacy of each of the diagnostic tests based on historical outcomes of actual diagnostic testing;
   analyzing a comparative utility of each diagnostic tests based on a plurality of factors that can affect problem resolution;
   assigning a weight to each factor involved in the probabilistic failure mode analysis;
   ordering the diagnostic tests based upon at least one of: a probability of the diagnostic test identifying a cause of the failure mode in a minimum amount of time; a probability of the diagnostic test identifying the cause of the failure mode at a minimum cost; and a relative weighting of minimizing time versus minimizing cost; and
   selecting a first diagnostic test from the group based at least in part on the probabilistic failure mode analysis and the weighted factors involved therein.

2. The computer-implemented method of claim 1, further comprising performing the failure mode analysis to quantify a comparative utility of an individual diagnostic test.

3. The computer-implemented method of claim 1, wherein the failure mode analysis is based at least in part on at least one factor selected from the following: an estimated time required to perform the first diagnostic test, a difficulty of performing the first diagnostic test, an estimated time required to remove and replace a component, a difficulty of removing and replacing the component, and a level of expertise of a vehicle service technician.

4. The computer-implemented method of claim 1, wherein the failure mode analysis is based at least in part on at least one factor selected from the following: an availability of a replacement component, an estimated cost of the component, an estimated cost per time unit of labor, empirical data regarding a probability that the failure mode exists given the existence of the symptom, an estimate of the probability that the failure mode exists given the existence of the symptom, a frequency of the failure mode, a vehicle mileage, a vehicle configuration, a vehicle modification, a vehicle maintenance record, a service center maintenance record, a manufacturer warranty record, a recommended maintenance schedule for the vehicle, and a technical service bulletin.

5. The computer-implemented method of claim 1, wherein the assigning the weight is based at least in part on assigning the weight to each of a plurality of factors selected from the following: an estimated time required to perform the first diagnostic test, a difficulty of performing the first diagnostic test, an estimated time required to remove and replace a component, a difficulty of removing and replacing the component, a level of expertise of a vehicle service technician, an availability of a replacement component, an estimated cost of the replacement component, an estimated cost per time unit of labor, empirical data regarding a probability that the failure mode exists given the existence of the symptom, an estimate of the probability that the failure mode exists given the existence of the symptom, a frequency of the failure mode, a vehicle mileage, a vehicle configuration, a vehicle modification, a vehicle maintenance record, a service center maintenance record, a manufacturer warranty record, a recommended maintenance schedule for the vehicle, and a technical service bulletin, wherein the failure mode analysis is based at least in part on the weighted factors.

6. The computer-implemented method of claim 5, wherein the weight assigned to at least one of the factors is based at least in part on a user preference setting.

7. The computer-implemented method of claim 1, wherein the failure mode analysis is based at least in part on a Failure Mode and Effects Analysis compiled by a manufacturer of the vehicle.

8. The computer-implemented method of claim 1, further comprising receiving a history of the vehicle, wherein the step of selecting the first diagnostic test is further based at least in part on the history.

9. The computer-implemented method of claim 8, wherein the history comprises at least one selected from the following: a vehicle mileage, a vehicle configuration, a vehicle modification, a vehicle maintenance record, a service center maintenance record, and a manufacturer warranty record.

10. The computer-implemented method of claim 1, wherein the first diagnostic test has a highest probability of identifying a cause of the symptom in a least amount of time among the group based at least in part on the failure mode analysis.

11. The computer-implemented method of claim 1, wherein the first diagnostic test has a highest probability of identifying a cause of the symptom with a lowest cost among the group based at least in part on the failure mode analysis.

12. The computer-implemented method of claim 1, further comprising:
    selecting a plurality of additional diagnostic tests from the group based at least in part on the failure mode analysis; and
    ordering the additional diagnostic tests based at least in part on the failure mode analysis.

13. The computer-implemented method of claim 12, wherein the selection and ordering is further based on a decreasing probability of each of the additional diagnostic tests identifying a cause of the symptom in a least amount of time based on the failure mode analysis.

14. The computer-implemented method of claim 12, wherein the selection and ordering is further based on a decreasing probability of each of the additional diagnostic tests identifying a cause of the symptom with a lowest cost based on the failure mode analysis.

15. A diagnostic tool for optimizing a diagnostic test sequence to diagnose a failure mode of a vehicle, comprising:
    a diagnostic test selector configured to determine a group of diagnostic tests related to a symptom from a pool of diagnostic tests;
    a failure mode analyzer configured to determine the efficacy of each of the diagnostic tests based on historical outcomes of actual diagnostic testing via probabilistic failure mode analysis;
    an analyzer configured to analyze a comparative utility of each diagnostic tests based on a plurality of factors that can affect problem resolution:
    a weighter configured to assign a weight to each factor involved in the probabilistic failure mode analysis;
    an orderer configured to order the diagnostic tests based upon at least one of: a probability of the diagnostic test identifying a cause of the failure mode in a minimum amount of time; a probability of the diagnostic test identifying the cause of the failure mode at a minimum cost; and a relative weighting of minimizing time versus minimizing cost; and
    a sequence optimizer configured to select a first diagnostic test from the group based at least in part on the probabilistic failure mode analysis and the weighted factors involved therein.

16. The diagnostic tool of claim 15, wherein the failure mode analyzer is configured to quantify a comparative utility of an individual diagnostic test.

17. The diagnostic tool of claim 16, wherein the failure mode analyzer is further configured to base the comparative utility at least in part on at least one factor selected from the following: an estimated time required to perform the first diagnostic test, a difficulty of performing the first diagnostic test, an estimated time required to remove and replace a component, a difficulty of removing and replacing the component, and a level of expertise of a vehicle service technician.

18. The diagnostic tool of claim 16, wherein the failure mode analyzer is further configured to base the comparative utility at least in part on at least one factor selected from the following: an availability of a replacement component, an estimated cost of the replacement component, an estimated cost per time unit of labor, empirical data regarding a probability that the failure mode exists given the existence of the symptom, an estimate of the probability that the failure mode exists given the existence of the symptom, a frequency of the failure mode, a vehicle mileage, a vehicle configuration, a vehicle modification, a vehicle maintenance record, a service center maintenance record, a manufacturer warranty record, a recommended maintenance schedule for the vehicle, and a technical service bulletin.

19. The diagnostic tool of claim 16, wherein the factor weighter is configured to assign a weight to each of a plurality of factors selected from the following: an estimated time required to perform the first diagnostic test, a difficulty of performing the first diagnostic test, an estimated time required to remove and replace a component, a difficulty of removing and replacing the component, a level of expertise of a vehicle service technician, an availability of a replacement component, an estimated cost of the replacement component, an estimated cost per time unit of labor, empirical data regarding a probability that the failure mode exists given the existence of the symptom, an estimate of the probability that the failure mode exists given the existence of the symptom, a frequency of the failure mode, a vehicle mileage, a vehicle configuration, a vehicle modification, a vehicle maintenance record, a service center maintenance record, a manufacturer warranty record, a recommended maintenance schedule for the vehicle, and a technical service bulletin, wherein the failure mode analyzer is further configured to base the comparative utility at least in part on the weighted factors.

20. The diagnostic tool of claim 19, wherein the factor weighter is further configured to base the weight assigned to at least one of the factors at least in part on a user preference setting.

21. The diagnostic tool of claim 16, wherein the failure mode analyzer is further configured to base the comparative utility at least in part on a Failure Mode and Effects Analysis compiled by a manufacturer of the vehicle.

22. The diagnostic tool of claim 16, further comprising a history receiver configured to receive a history of the vehicle, wherein the failure mode analyzer is further configured to base the comparative utility at least in part on the history.

23. The diagnostic tool of claim 15, wherein the sequence optimizer is further configured to order a plurality of additional diagnostic tests from the group based at least in part on the failure mode analysis.

24. A diagnostic tool for optimizing a diagnostic test sequence to diagnose a failure mode of a vehicle, comprising:
   a diagnostic test selector configured to determine a group of diagnostic tests related to a symptom from a pool of diagnostic tests;
   a sequence optimizer configured to select a first diagnostic test from the group based at least in part on a probabilistic failure mode analysis, the probabilistic failure mode analysis being based on historical outcomes of actual diagnostic testing;
   a failure mode analyzer configured to quantify a comparative utility of an individual diagnostic test based on a plurality of factors that can affect problem resolution;
   a factor weighter configured to assign a weight to each of a plurality of failure mode analysis factors;
   a test orderer configured to order the diagnostic tests based upon at least one of: a probability of the diagnostic test identifying a cause of the failure mode in a minimum amount of time; a probability of the diagnostic test identifying the cause of the failure mode at a minimum cost; and a relative weighting of minimizing time versus minimizing cost; and
   a history receiver configured to receive a history of the vehicle, wherein the failure mode analyzer is further configured to base the comparative utility at least in part on the history.

25. A computer-implemented method of optimizing a diagnostic test sequence to diagnose a failure mode of a vehicle, comprising:
   determining a group of diagnostic tests related to a symptom from a pool of diagnostic tests;
   optimizing an order of a plurality of diagnostic test procedures related to a failure mode identified for the vehicle, the optimization, at least in part, comprising:
      conducting a probabilistic failure mode analysis determining the efficacy of each of the diagnostic tests based on historical outcomes of actual diagnostic testing;
      analyzing a comparative utility of each diagnostic tests based on a plurality of factors that can affect problem resolution;
      assigning a weight to each factor involved in the probabilistic failure mode analysis;
      ordering the diagnostic tests based upon at least one of: a probability of the diagnostic test identifying a cause of the failure mode in a minimum amount of time; a probability of the diagnostic test identifying the cause of the failure mode at a minimum cost; and a relative weighting of minimizing time versus minimizing cost;
      selecting a first diagnostic test from the group based at least in part on a probabilistic failure mode analysis and the weighted factors involved therein; and
      iteratively optimizing the order of the plurality of diagnostic test procedures in response to prompting by an intermediate diagnostic test information being received.

26. The method of claim 25, wherein the failure mode analysis is based at least in part on at least one factor selected from the following: an estimated time required to perform the first diagnostic test, a difficulty of performing the first diagnostic test, an estimated time required to remove and replace a component, a difficulty of removing and replacing the component, and a level of expertise of a vehicle service technician.

27. The method of claim 25, wherein the failure mode analysis is based at least in part on at least one factor selected from the following: an availability of a replacement component, an estimated cost of the replacement component, an estimated cost per time unit of labor, empirical data regarding a probability that the failure mode exists given the existence of the symptom, an estimate of the probability that the failure mode exists given the existence of the symptom, a frequency of the failure mode, a vehicle mileage, a vehicle configuration, a vehicle modification, a vehicle maintenance record, a service center maintenance record, a manufacturer warranty record, a recommended maintenance schedule for the vehicle, and a technical service bulletin.

28. The method of claim 25, wherein the assigning a weight is based at least in part on assigning a weight to each of a plurality of factors selected from the following: an estimated time required to perform the first diagnostic test, a difficulty of performing the first diagnostic test, an estimated time required to remove and replace a component, a difficulty of removing and replacing the component, a level of expertise of a vehicle service technician, an availability of a replacement component, an estimated cost of the replacement component, an estimated cost per time unit of labor, empirical data regarding a probability that the failure mode exists given the existence of the symptom, an estimate of the probability that the failure mode exists given the existence of the symptom, a frequency of the failure mode, a vehicle mileage, a vehicle configuration, a vehicle modification, a vehicle maintenance record, a service center maintenance record, a manufacturer warranty record, a recommended maintenance schedule for the vehicle, and a technical service bulletin, wherein the failure mode analysis is based at least in part on the weighted factors.

29. The method of claim 28, wherein the weight assigned to at least one of the factors is based at least in part on a user preference setting.

30. The method of claim 25, wherein the failure mode analysis is based at least in part on a Failure Mode and Effects Analysis compiled by a manufacturer of the vehicle.

31. The method of claim 25, further comprising receiving a history of the vehicle, wherein the step of selecting the first diagnostic test is further based at least in part on the history.

32. The method of claim 25, wherein the first diagnostic test has a highest probability of identifying a cause of the symptom in a least amount of time among the group based at least in part on the failure mode analysis.

33. The method of claim 25, wherein the first diagnostic test has a highest probability of identifying a cause of the symptom with a lowest cost among the group based at least in part on the failure mode analysis.

* * * * *